US005199376A

United States Patent [19]
Pasco

[11] Patent Number: 5,199,376
[45] Date of Patent: Apr. 6, 1993

[54] POINTERS

[75] Inventor: Ian K. Pasco, Warfield, England

[73] Assignee: Combined Optical Industries Limited, Slough, United Kingdom

[21] Appl. No.: 555,644

[22] Filed: Jul. 23, 1990

[30] Foreign Application Priority Data

Jul. 29, 1989 [GB] United Kingdom ............... 8917411

[51] Int. Cl.$^5$ .................. G01D 11/28; G01D 13/22
[52] U.S. Cl. .................................. 116/332; 116/328; 116/288; 116/DIG. 6
[58] Field of Search ............... 116/287, 288, 297, 327, 116/328, 330, 332, 333, DIG. 5, DIG. 6, DIG. 36; 362/26

[56] References Cited

U.S. PATENT DOCUMENTS

| | | | |
|---|---|---|---|
| 3,696,295 | 10/1972 | Kisselmann et al. | 116/328 |
| 4,218,726 | 8/1980 | Fukasawa et al. | 362/23 |
| 4,233,927 | 11/1980 | Oikawa et al. | 116/287 |
| 4,860,170 | 9/1989 | Sakakibara et al. | 362/26 |
| 4,872,093 | 10/1989 | Shimizu | 362/26 |

FOREIGN PATENT DOCUMENTS

| | | | |
|---|---|---|---|
| 559350 | 2/1975 | Switzerland | 116/330 |
| 2024426 | 1/1980 | United Kingdom | 116/288 |

Primary Examiner—William A. Cuchlinski, Jr.
Assistant Examiner—W. Morris Worth
Attorney, Agent, or Firm—Oblon, Spivak, McClelland, Maier & Neustadt

[57] ABSTRACT

An illuminable pointer comprising an at least translucent pointer staff and an at least translucent boss suitable for illumination by a light source, wherein the boss includes a staff hole adapted for mounting the pointer for rotation on a spindle and a cavity for holding a known mass to counterbalance the pointer staff, the boss having reflecting surface shaped so to reflect substantially parallel incoming light along the pointer staff towards a focus point outside the distal end of the pointer that the pointer staff is evenly illuminated.

13 Claims, 8 Drawing Sheets

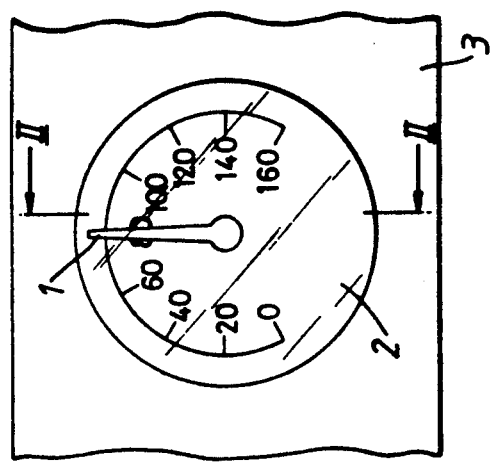
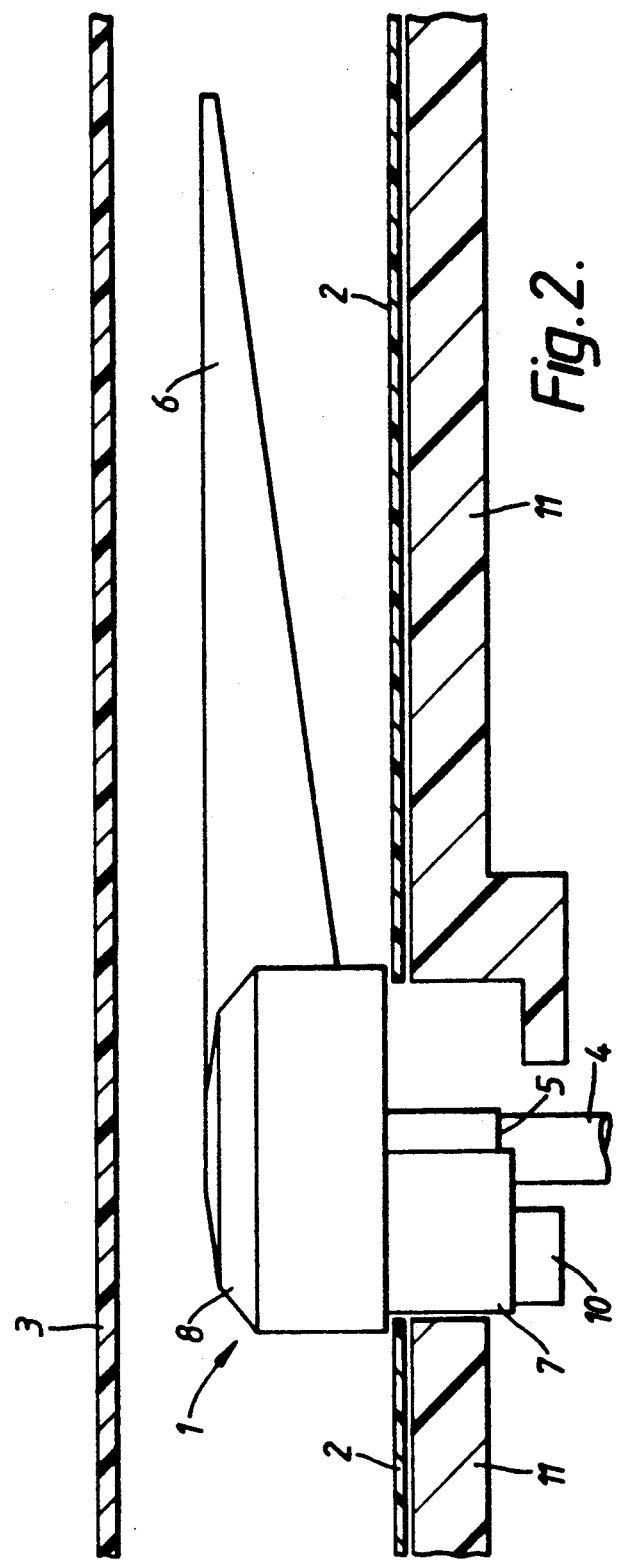

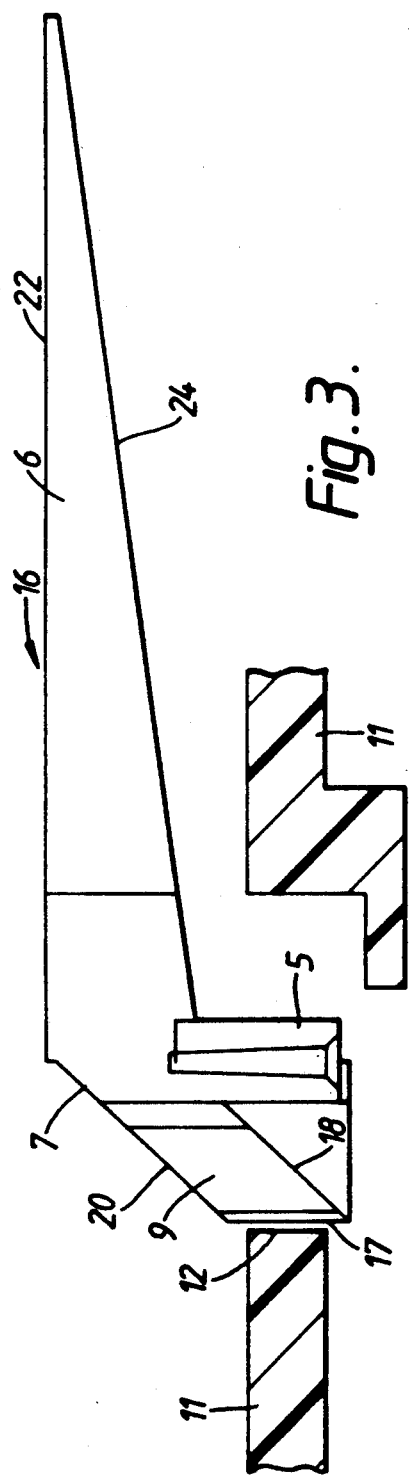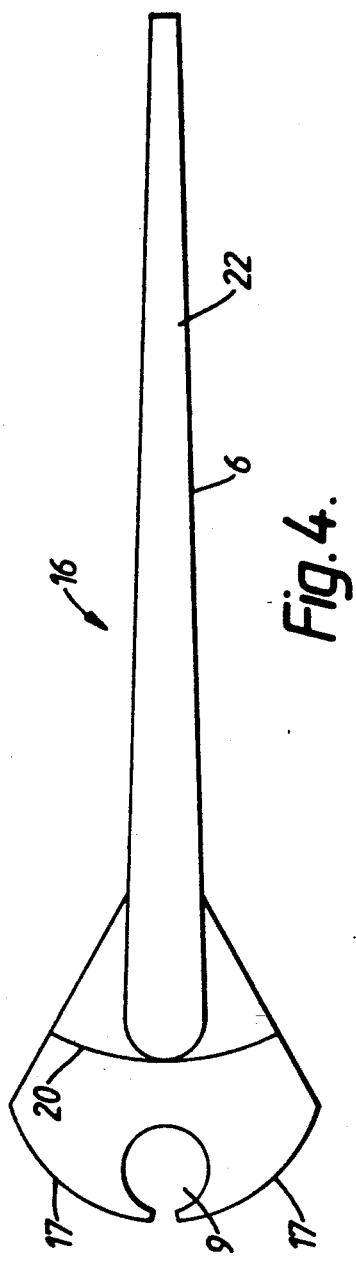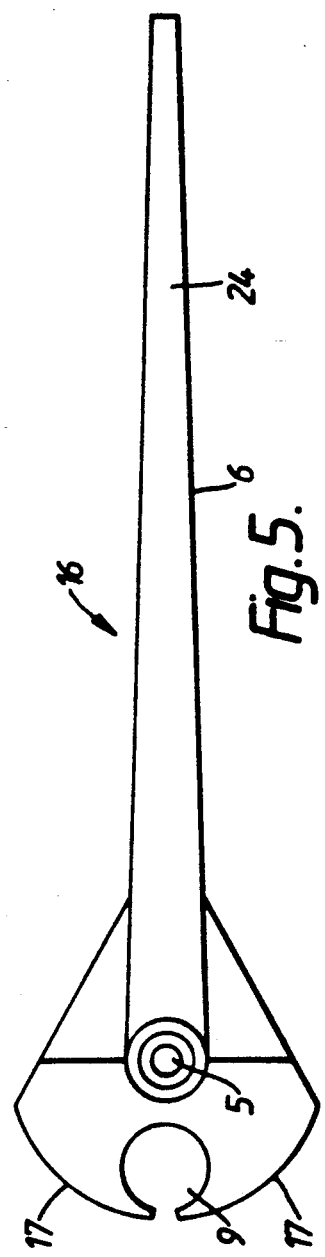

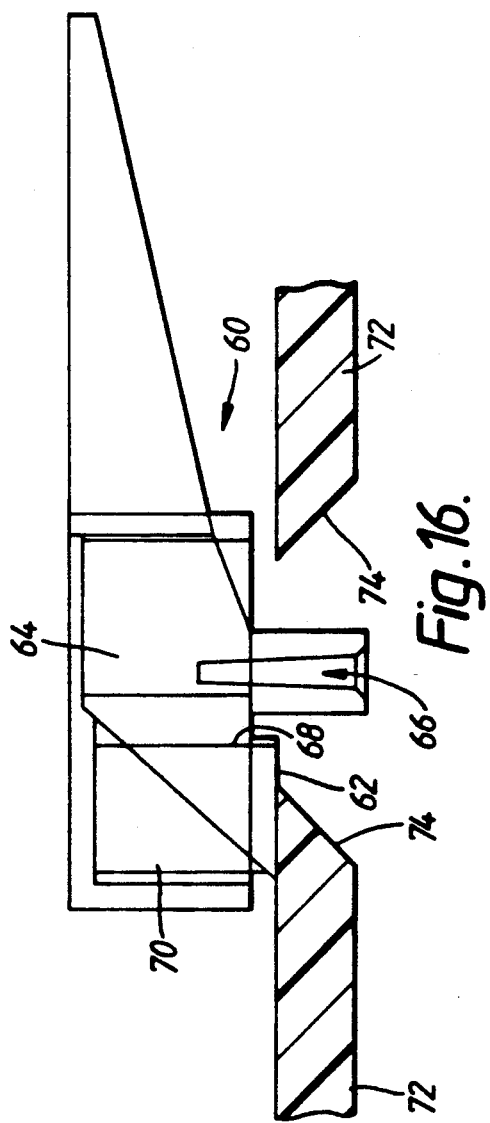
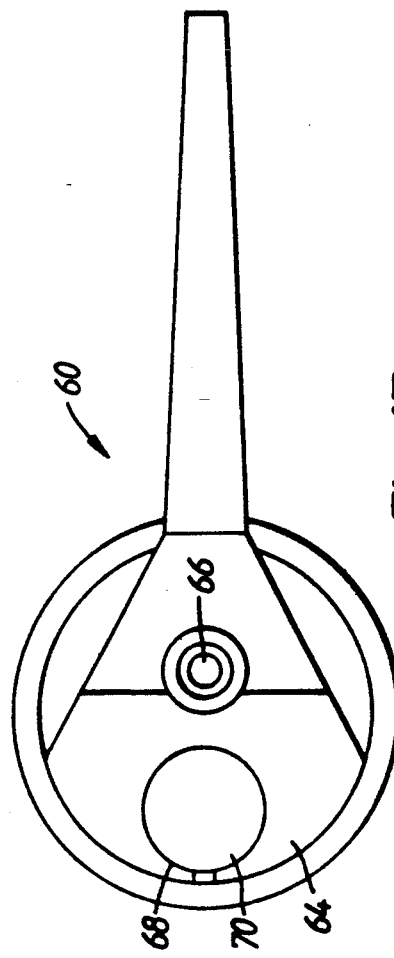

POINTERS

This invention concerns improvements in or relating to pointers such as are used, for example, as instrumentation needles for motor cars, automobiles, lorries, vans, boats, and the like. The invention particularly, but not exclusively, relates to transparent pointers which may be illuminated in low ambient light conditions. These pointers are typically used in illuminated panels with several other instruments often being illuminated from a single source.

Conventional transparent pointers of the kind having a boss and pointer staff that are illuminated to increase their visibility are moulded from a transparent plastic material, typically an acrylic polymer. A feature in the boss directs light to a pointer staff from the instrument back plate. Light may be transmitted from a central or unitary source along a light guide. The feature in the boss may comprise a first surface disposed at 45° to the plane of the light guide so that it totally internally reflects the incoming light upwardly towards a second reflecting surface that is parallel to the first surface and which directs the light towards the pointer staff. The boss has a separate black plastics cap to contain excess light and provide the desired cosmetic styling. However the conventional pointer does not gather as much light from the light guide as is possible due to its configuration, and allows light to escape from the pointer in directions that do not assist in increasing its visibility. Thus conventional pointers have a low optical efficiency, and to increase their visibility, by increasing the brightness of the pointer staff, would require additional light sources which would increase the complexity and cost of the pointer assembly. Alternatively an increase in the luminosity of the light source would increase the brightness of other features on the instrument panel which does not assist in increasing the clarity of the display and may cause durability problems. It is therefore desirable to increase the optical efficiency of pointers.

One further problem with such pointers is that they usually require balancing in order to provide a predetermined sweep resistance throughout their operating arc. Conventionally the pointer is formed as an injection moulded body having a staff hole at a preset fixed position and a receiver cavity at a fixed position spaced from the staff hole. A metal or similar high density weight is affixed by hot-staking or other fastening methods in the receiver cavity and is then machined to provide the precise balance required. This technique, which is based on the concept of having a preset staff hole position and then adjusting the amount of weight by machining, involves individual balancing of each and every pointer in a batch or series being produced.

It is an object of the present invention to provide a pointer that does not require balancing after assembly. It is a further object of this invention to provide a pointer with a higher optical efficiency than previously known and thereby increase the brightness of the illuminated pointer without affecting the brightness of or contrast with other parts of the illuminated instrument or instruments.

According to the present invention there is provided an illuminable pointer comprising a transparent or translucent pointer staff and a transparent or translucent boss suitable for illumination by a light source characterised in that the boss includes a staff hole adapted for mounting the pointer on a spindle and a cavity for holding a known mass to counterbalance the pointer staff, the boss having reflecting means shaped so to reflect incoming light along the pointer staff towards a focus point that the pointer staff is evenly illuminated.

The reflecting means may be an aspheric totally internally reflecting surface.

The aspheric surface is preferably conic surface described by the equation:

$$y^2 = 2R_v Z - PZ^2$$

where:
y = off axis distance;
Z = curve sag;
$R_v$ = curve vertex radius; and
P = curve eccentricity.

Alternatively, the aspheric surface may be a complex asphere described by the equation:

$$Z = (y^2/R_v)/(1 + (1 - (P(y^2/R_v^2))^{\frac{1}{2}}) + A4y^4 + A6y^6 + A8y^8 + A10y^{10} + \ldots + A_n y^n$$

where
y = off-axis distance;
Z = curve sag;
$R_v$ = curve vertex radius;
P = curve eccentricity; and
n = any even integer
and A4, A6, A8, A10 etc. are correction coefficients.

The focus point is preferably outside the pointer staff.

In this case, the focus point is adapted to illuminate preferentially the upper surface of the pointer staff directly, and preferably an upper surface of the pointer staff is painted with a translucent paint.

Alternatively the focus point is adapted to illuminate the lower surface of the pointer staff, and preferably a lower surface of the pointer staff is matted or painted.

A planar light guide may be used to convey light to the pointer, and the boss may have a first planar reflecting means to direct the incoming light towards the said reflecting means.

Preferably the first reflecting means is a totally internally reflecting surface disposed at 45° to the plane of the incoming light, and which extends around the staff hole substantially over 180° to gather as much light as possible.

In certain embodiments, the staff hole is displaced towards or away from the pointer staff along a line from the centre of the boss by an amount dependent upon the required balance point.

The pointer may be formed by moulding and the known mass may be inserted into the boss after moulding or the pointer may be moulded around it whilst it is held in position.

The pointer may include a tail section extending from the boss in the direction opposite to the pointer staff and which is illuminated by a second shaped reflecting means.

Embodiments of the invention will now be more particularly described, by way of example and with reference to the accompanying drawings, in which:

FIG. 1 is a front view of a dial on an instrument panel;

FIG. 2 is a sectional view along the line II—II of FIG. 1 showing a first embodiment of a pointer embodying the present invention, the sectioned surfaces being shown as opaque whether or not they are transparent, for purposes of clarity;

FIG. 3 is a cross-sectional side view of the moulded component of the pointer and of the light guide shown in FIG. 2;

FIG. 4 is a plan view of the component shown in FIG. 3;

FIG. 5 is a plan view from the underside of the component shown in FIG. 3;

FIG. 16 is a sectional side view of a fifth embodiment of a pointer;

FIG. 17 is an underside plan view of the pointer shown in FIG. 16;

FIG. 18 is a section of an alternative pointer staff embodiment; and

FIG. 19 is a section of a further alternative pointer staff embodiment.

Figure 7:
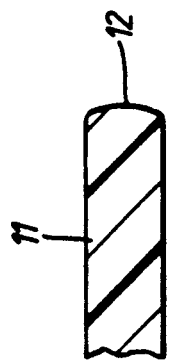
FIG. 7 is a cross-sectional view of an alternative light guide termination.
Figure 6:
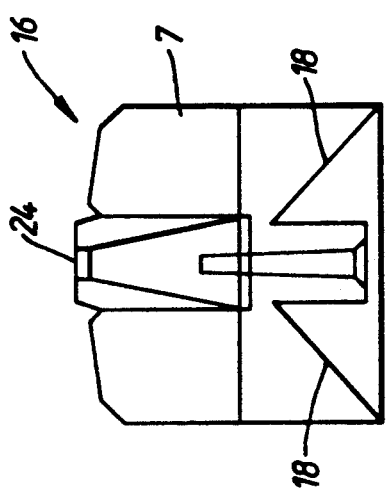
FIG. 6 is an end view of the pointer shown in FIG. 3.

Referring to FIGS. 1 and 2 there is shown a pointer 1 mounted in a circular hole in an instrumentation dial 2, which may be part of an instrument display panel, covered by a transparent protective glazing 3. The pointer 1 is mounted on a spindle 4 which engages a staff hole 5 in the pointer 1. The pointer 1 comprises, as one piece, a pointer staff 6 and a boss 7, most of the boss 7 lying under an opaque cap 8 for cosmetic purposes. The opaque cap is intended to prevent spurious light emissions. Within the boss 7, on the opposite side of the staff hole 5 to the pointer staff 6 is an interference fit cavity 9 to receive an accurately known mass 10. Also shown in FIG. 2 is a light guide 11 which lies under the dial 2 and which has a circular hole, aligned co-axially with the circular hole in the dial 2, to allow the pointer 1 to be mounted on the spindle 4 through the dial 2 and light guide 11. The light guide 11 terminates in a surface substantially perpendicular to the plane of the light guide 11 and which is a light emitting surface 12. On the underside of the light guide 11 is an integral pointer stop which has a projecting portion to obstruct the protruding part of the known mass 10.

FIGS. 3 to 6 show a moulded component 16 that forms the substantial part of the pointer 1. Without other components there can now clearly be seen the cavity 9, a light input surface 17, a first totally internally reflecting surface 18 and a second totally internally reflecting surface 20. The pointer staff 6 has an upper surface 22 and a lower surface 24.

The operation and advantages of the pointer shown in FIGS. 2 to 6 will now be described. To provide a predefined sweep resistance throughout its operating arc the pointer 1 must be balanced about the spindle 4. This is especially the case in automobile dashboard applications where the display is often mounted near vertical and a high performance is required. Thus the known mass 10 is provided to counterbalance, to the required degree, the pointer staff 6. The known mass 10 may be of any convenient type that provides a wide range of high tolerance masses of suitable shape, such as a needle roller or ball bearing. Since the weight (mass) of mass 10 is accurately known and its position is predetermined by the location of the cavity 9 in relation to the staff hole, the pointer 1 will be balanced without the need for any further changes to the mass 10. As an alternative method of construction the known mass 10 may be held in position while the moulded component 16 is formed about it as in, for instance, an injection moulding process.

To increase the visibility of the pointer staff 6 in low ambient light conditions the pointer staff 6 is internally illuminated and more particularly it is illuminated so that the upper surface 22 has an increased visibility. The light guide 11, boss 7 and pointer staff 6 are all made of a transparent or translucent material, such as polymethyl methacrylate or other suitable material. The illumination is described, with particular reference to FIGS. 8 and 9, following the path of the light from the light source (not shown) which supplies light to the light guide 11. It will be appreciated that the light paths shown are averages over all the possible light path ways and merely give an indication of the illumination achieved with the present invention. The method of illumination of the light guide 11 is described in European Patent Number EP 0 029 638 which is included herein by reference. The light from the light source is totally internally reflected along the light guide 11 and emitted at the light emitting surface 12. The light source is arranged so that the full circumference of light emitting surface 12 is substantially evenly illuminated. The form of the light emitting surface 12 may be planar, as shown in FIG. 3, or convex as shown in FIG. 7 to converge the light being emitted from the light guide 11 to increase the luminosity of the light emitted from surface 12.

The light leaving the surface 12 enters the boss 7 through the light input surface 17. The light input surface 17 is longer in the direction of the axis of rotation of the pointer 1 than the light emitting surface 12, thus a certain amount of inaccuracy in the vertical mounting of the pointer 1 on the spindle 4 is possible which therefore allows the pointer 1 to be mounted on the spindle 4 by a simple push fit. The light entering through the light input surface 17 is totally internally reflected by the first reflecting 18 which is disposed at 45° to the plane of the light guide 11 to project the incoming light upwardly (as shown in the drawing) towards the second reflecting surface 20. The first reflecting surface 18 extends in a full semi-circle on the opposite side of the spindle 4 from the pointer staff 6, disposed at 45° to the plane of the light guide 11 throughout. In this way the boss 7 collects more light from the light guide 11 than in previous known pointers. The second reflective surface 20 is specially shaped to direct, in combination with the other features, as much light as possible towards the pointer staff 6 thus increasing the efficiency of the system and reducing stray light emissions. In fact the increase in efficiency compared to the prior art pointers may be up to a factor of four. To achieve this the second reflecting surface 20 is a total internal reflector shaped to focus the light it receives. It is typically of aspheric form, either conic or complex aspheric. The surface is described by the equations:

$$Y^2 = 2R_v Z - PZ^2$$

or $$Z = (y^2/R_v)/(1+(1-(P \cdot (y^2/R_v^2)))^{\frac{1}{2}} + A_4 y^4 + A_6 y^6 + A_8 y^8 + A_{10} y^{10} + \ldots A_n y^n$$

Where in both equations:
 y = off axis distance
 Z = curve sag
 $R_v$ = curve vertex radius
 P = curve eccentricity
 n = an even integer
Coefficients A4, A6, A8, A10 etc (to any limit) are adjustable but will typically be of the order:
 A4 = $-10^{-12}$
 A6 = $-10^{-14}$
 A8 = $-10^{-16}$
 A10 = $-10^{-18}$
when they are used. Of course, other figures may be required in some circumstances.

Figure 8:
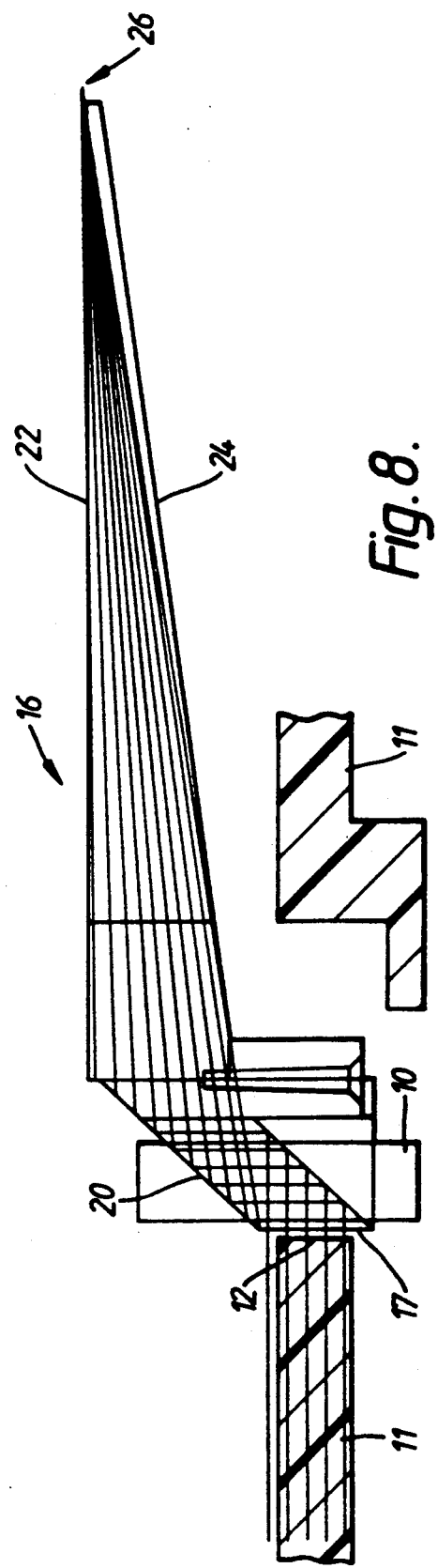
FIG. 8 is a cross-sectional side view of the pointer shown in FIG. 2 with the known mass included and a possible light path shown.
Figure 9:
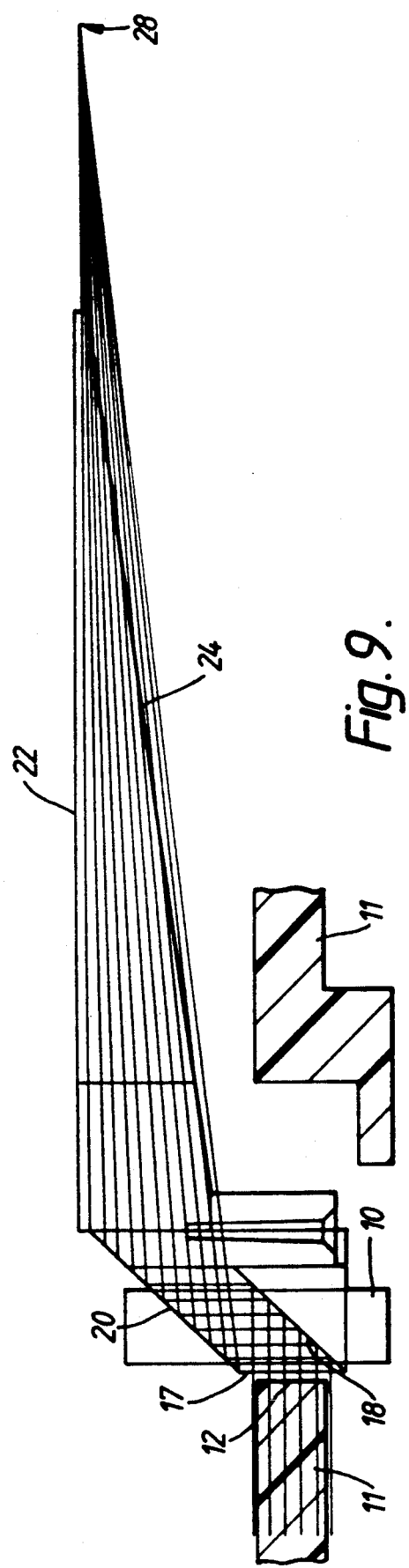
FIG. 9 shows the pointer of FIG. 2 with an alternative light path to that shown in FIG. 8.

There are many surfaces which can achieve this focussing effect, and the above are merely described as preferred examples. Thus the aspheric surface 20 is shaped to focus the light from the first reflecting surface 18 at a point 26 in space in such a way as to maximise the visibility of the pointer staff 6. As can be seen in FIG. 8, the point 26 in space may be located above the distal end of the pointer to illuminate directly the upper surface 22 of the pointer staff 6 by having the focus point 26 above the level of the upper surface 2. The light is not reflected by the upper surface 22 because of a paint layer applied to the upper surface 22 which modifies the refractive index changes occurring between the pointer and the air, reducing the changes considerably and thereby reducing the internal reflectivity. The paint is either transparent, translucent, or phosphorescent. The focal point position must also be chosen to allow even distribution of the light. The correct focal point position can be determined by comparatively simple calculation or experimentation. Alternatively, and as shown in FIG. 9, the focal point 28 may be located below the distal end of the pointer to direct the reflected light towards the lower surface 24. In this case the lower surface 24 is matted or painted white and thus serves to illuminate the upper surface 22 by means of reflected light.

Figure 10:
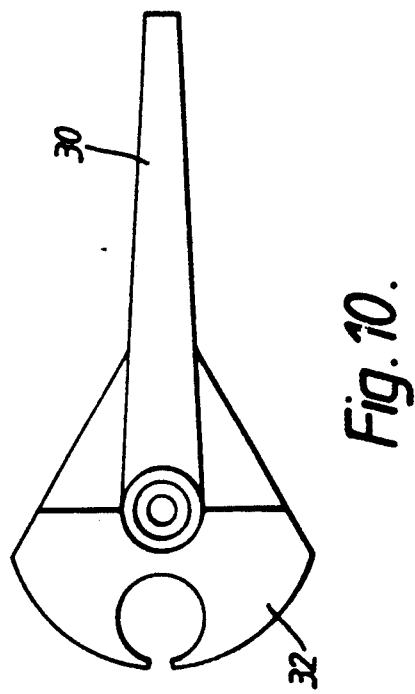
FIG. 10 is an underside plan view of a second embodiment of a pointer.

FIG. 10 shows a pointer staff 30 extending from a boss 32 in which the pointer staff 30 is shorter in relation to the size of the boss 32 than the embodiment discussed above. Obviously many such adaptations are possible.

Figure 11:
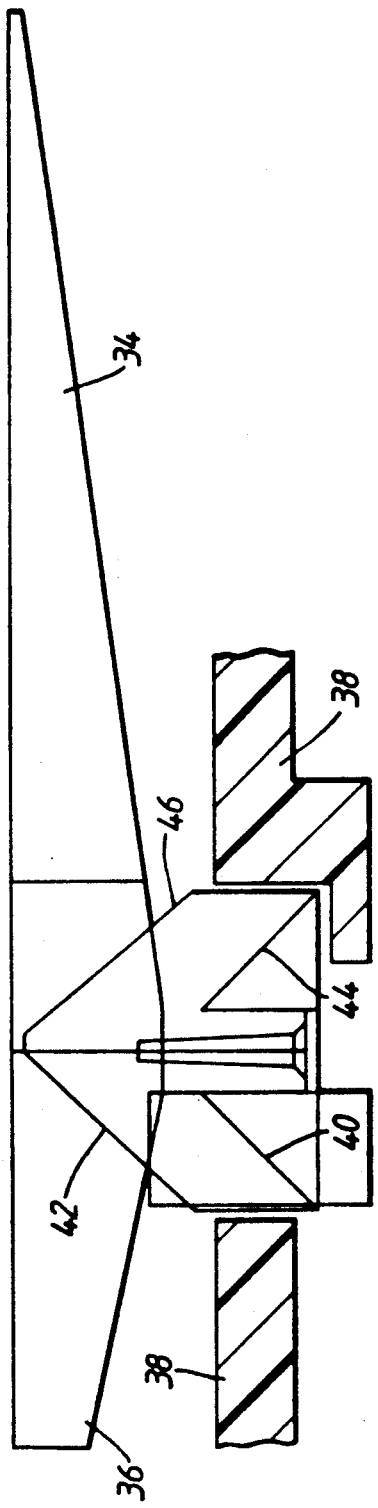
FIG. 11 is a sectional side view of a third embodiment of a pointer.
Figure 12:
FIG. 12 is an underside plan view of the pointer shown in FIG. 11.
Figure 13:
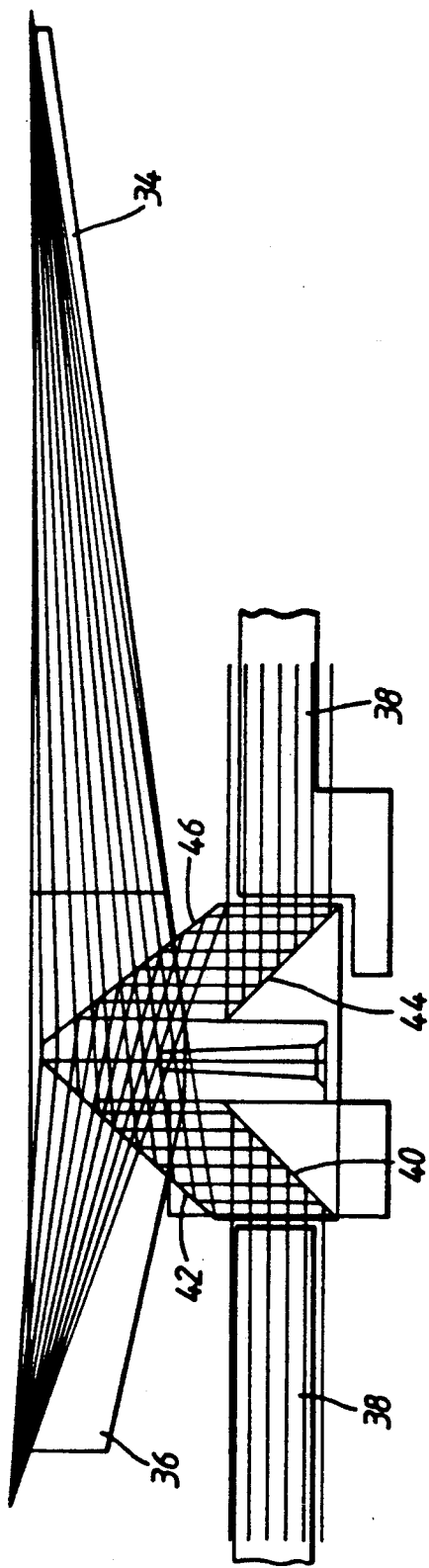
FIG. 13 shows the pointer of FIG. 11 with a light path illustrated.

FIGS. 11-13 show an adaptation of the pointer illustrated in FIGS. 2-6 wherein a pointer staff 34 is extended to include a tail section 36. Elements in the illuminating system are also shown: a light guide 38, a first reflecting surface 40 and a second reflecting surface 42. For illumination of the tail section 36 there is provided a third reflecting surface 44 and a fourth reflecting surface 46. The main part of the pointer staff 34 is illuminated as discussed above, the tail section 36 is illuminated in a similar manner by the third and fourth reflecting surfaces 44 and 46 respectively. The second and fourth reflecting surfaces 42 and 46 are of aspheric form as discussed above. This is further illustrated in FIG. 13 which shows the path of light rays through the moulded component of the pointer. Rays from the second reflecting surface 42 pass through the fourth reflecting surface 46, and vice versa, because rays that are incident at an angle greater than the critical angle are reflected and those at an angle less than the critical angle transmitted.

Figure 14:
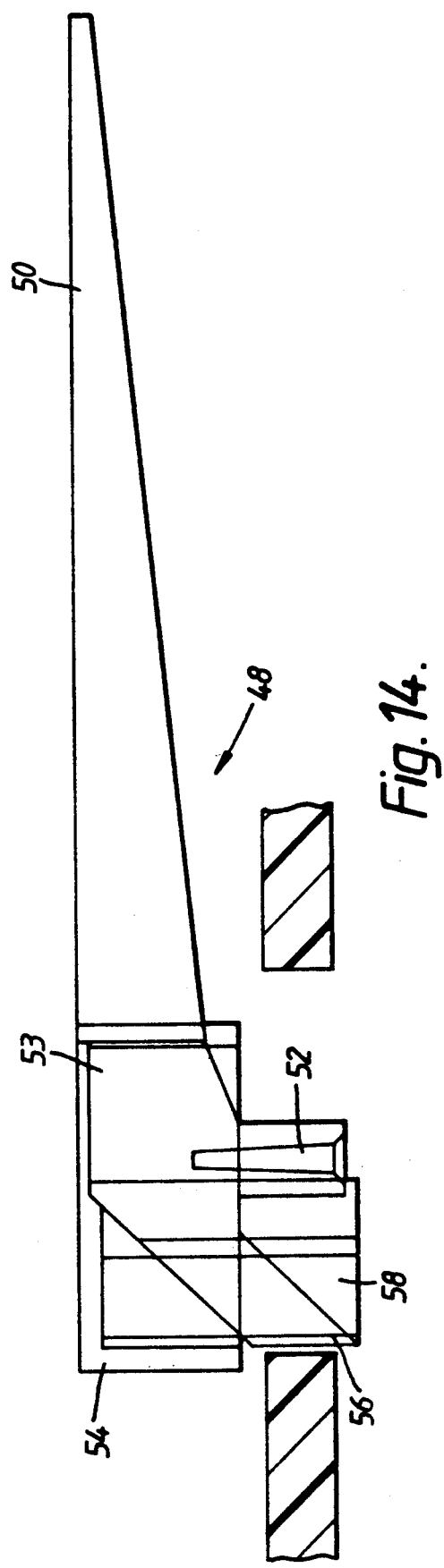
FIG. 14 is a sectional side view of a fourth embodiment of a pointer.
Figure 15:
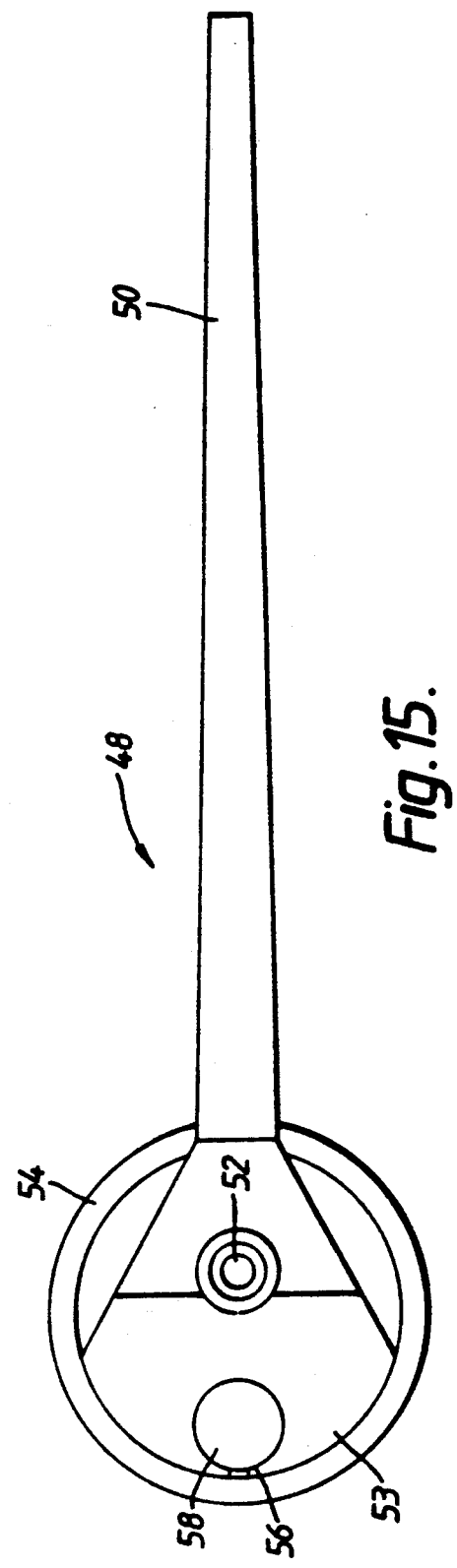
FIG. 15 is an underside plan view of the pointer shown in FIG. 14.

A further construction within the scope of the present invention is shown in FIG. 14 and 15. A pointer 48 substantially as discussed above is shown having a pointer staff 50, a staff hole 52 in a boss 53, an opaque cap 54, an interference fit cavity 56 and a known mass 58. In this embodiment the staff hole 52 is offset from the centre of the circle defined by the circumference of the opaque cap 54 along a line substantially in the direction of the pointer staff 50. The offset is therefore from the centre of the boss 53, however it is most clearly visualised with respect to the opaque cap 54. This displacement of the staff hole 52 allows a smaller known mass 58 to be used to counterbalance the pointer staff 50. The displacement of the staff hole 52 is small enough so that the eccentric motion of the opaque cap is not noticed under normal operating conditions.

The displacement of the staff hole also gives more design freedom allowing embodiments of the present invention such as that shown in FIGS. 16 and 17. A pointer 60 is shown with a light input surface 62 as part of a boss 64 which also comprises an offset staff hole 66 and an interference fit cavity 68. Also shown is a known mass 70 and a light guide 72 with a totally internally reflecting surface 74. The light travelling along the plane of the light guide 72 is reflected upwardly at the termination of the light guide 72 by the reflecting surface 74 disposed at 45° to the plane of the light guide 72. This is similar to the first reflecting surface used for this purpose in other embodiments. The light enters the boss through the surface 62 and thus proceeds to illuminate the pointer 60 in the manner described above. The remainder of the pointer 60 is substantially as discussed above except that the mass 70 cannot now protrude past the lower level of the boss 64, i.e. the surface 62, because of the light guide 72. This means that the mass 70 must have a larger aspect ratio to fit within the now confined space provided and still balance the pointer 60 despite the fact that it can be of lower mass due to the displacement of the staff hole. Therefore, for a needle roller, the diameter of the cavity 68 must be increased as shown in FIG. 17. This also means that an alternative pointer stop mechanism must be used.

Although the embodiments discussed above utilise totally internally reflecting surfaces these can, where feasible, be replaced by mirrored surfaces if desired.

Other possible variations within the scope of the invention include having alternative pointer staff sections, FIG. 18 shows a section providing a lower mass pointer staff and FIG. 19 shows a section providing increased base reflection. It will also be appreciated that where the offset staff hole is utilised the circumference of the opaque cap is merely used as a convenient reference to explain the movement of the staff hole. Any similar movement from the normal location of the staff hole is within the scope of the present invention.

We claim:
1. An illuminable pointer comprising an at least translucent pointer staff and an at least translucent boss suitable for illumination by a light source, wherein the boss includes a staff hole adapted for mounting the pointer for rotation on a spindle and a cavity for holding a known mass to counterbalance the pointer staff, the boss having reflecting means comprising an aspheric totally internally reflecting surface arranged to reflect substantially parallel incoming light along the pointer staff towards a focus point outside the distal end of said pointer staff so that the pointer staff is evenly illuminated by light impinging on an internal surface of said pointer staff substantially along the length thereof as said light travels from said reflecting means to said focus point.

2. A pointer as claimed in claim 1, in which the aspheric surface is a conic surface described by the equation:

$$y^2 = 2R_v Z - PZ^2$$

where:
y = off axis distance;
Z = curve sag;
$R_v$ = curve vertex radius; and
P = curve eccentricity.

3. A pointer as claimed in claim 1, in which the aspheric surface is a complex asphere described by the equation:

$$Z = (y^2/R_v)/(1 + (1 - (P(y^2/R_v^2)))^{\frac{1}{2}}) + A4y^4 + A6y^6 + A8y^8 + A10y^{10} + \ldots + A_n y^n$$

where
y = off-axis distance;
Z = curve sag;
$R_v$ = curve vertex radius;
P = curve eccentricity; and
n = any even integer
and A4, A6, A8, A10 etc. are correction coefficients.

4. A pointer as claimed in claim 1, in which the focus point is selected to be above said distal end to illuminate preferentially a viewing surface of the pointer staff directly.

5. A pointer as claimed in claim 4, in which said viewing surface of the pointer staff is painted with a translucent paint.

6. A pointer as claimed in claim 1, in which the focus point is selected to be below said distal end to illuminate a non-viewing surface of the pointer staff.

7. A pointer as claimed in claim 6, in which said non-viewing surface of the pointer staff is matted or painted.

8. A pointer as claimed in claim 1, in which a planar light guide is used to convey light to the pointer, and the boss has a first planar reflecting means to direct the incoming light towards the said reflecting means.

9. A pointer as claimed in claim 8, in which the first reflecting means is a totally internally reflecting surface disposed at 45° to the plane of the incoming light, and which extends around the staff hole substantially over 180° to gather as much light as possible.

10. A pointer as claimed in claim 1, in which the staff hole is displaced from the pointer staff along a line from the centre of the boss by an amount dependent upon the required balance point.

11. A pointer as claimed in claim 1, in which the pointer is formed by moulding and in that the known mass is inserted into the boss after moulding.

12. A pointer as claimed in claim 1, in which the pointer is moulded around the known mass whilst it is held in position.

13. A pointer as claimed in claim 1, in which the pointer includes a tail section extending from the boss in the direction opposite to the pointer staff and which is illuminated by a second shaped aspheric reflecting means.

* * * * *